(12) United States Patent
Ginja

(10) Patent No.: US 11,059,520 B2
(45) Date of Patent: Jul. 13, 2021

(54) MONOBLOC PART FORMING A FRONT BLOC COMPRISING AN ABSORPTION SYSTEM AND AN AERODYNAMIC SYSTEM

(71) Applicant: Compagnie Plastic Omnium, Lyons (FR)

(72) Inventor: Stéphane Ginja, Amberieu en Bugey (FR)

(73) Assignee: Compagnie Plastic Omnium

( * ) Notice: Subject to any disclaimer, the term of this patent is extended or adjusted under 35 U.S.C. 154(b) by 140 days.

(21) Appl. No.: 16/124,703

(22) Filed: Sep. 7, 2018

(65) Prior Publication Data

US 2019/0071130 A1    Mar. 7, 2019

(30) Foreign Application Priority Data

Sep. 7, 2017 (FR) ...................................... 1758255

(51) Int. Cl.
*B62D 25/08* (2006.01)
*B60R 19/26* (2006.01)
*B60R 19/48* (2006.01)
*B60R 19/04* (2006.01)
(Continued)

(52) U.S. Cl.
CPC .............. *B62D 25/08* (2013.01); *B32B 15/08* (2013.01); *B32B 15/18* (2013.01); *B32B 15/20* (2013.01); *B60R 19/023* (2013.01); *B60R 19/04* (2013.01); *B60R 19/26* (2013.01); *B60R 19/48* (2013.01); *B60R 21/34* (2013.01); *B62D 25/085* (2013.01); *B62D 29/004* (2013.01);
(Continued)

(58) Field of Classification Search
CPC .... B62D 25/08; B62D 25/085; B62D 29/008; B62D 29/004; B62D 29/04; B60R 19/48; B60R 19/04; B60R 19/023; B60R 19/26; B60R 21/34; B60R 2019/486; B32B 15/08; B32B 15/18; B32B 15/20; B32B 2605/08; B60K 11/04; B29K 2705/12; B29L 2031/3044; B29C 45/14311
USPC ........................................ 296/193.09, 187.04
See application file for complete search history.

(56) References Cited

U.S. PATENT DOCUMENTS 6,412,855 B1 *  7/2002  Cantineau ............ B62D 25/084
                                                    296/187.01
8,267,446 B2 *  9/2012  Gonin ..................... B60R 19/12
                                                    293/120
(Continued)

FOREIGN PATENT DOCUMENTS

FR      2981887 A1      5/2013
FR      3038290 A1      1/2017
(Continued)

OTHER PUBLICATIONS

European Search Report and Written Opinion Application No. EP 18 19 3228 dated Jan. 22, 2019 3 pages.
(Continued)

*Primary Examiner* — Joseph D. Pape
*Assistant Examiner* — Dana D Ivey
(74) *Attorney, Agent, or Firm* — St. Onge Steward Johnston & Reens, LLC

(57) ABSTRACT

The invention relates to a monobloc part forming a front block for motor vehicle including a structural portion forming an energy absorption system, and a moulded semi-structural portion forming at least an aerodynamic system, the semi-structural portion being overmoulded on the structural portion.

21 Claims, 3 Drawing Sheets

(51) Int. Cl.
*B60R 19/02* (2006.01)
*B60R 21/34* (2011.01)
*B62D 29/00* (2006.01)
*B32B 15/08* (2006.01)
*B32B 15/18* (2006.01)
*B32B 15/20* (2006.01)
*B62D 29/04* (2006.01)
*B60K 11/04* (2006.01)
*B29K 705/12* (2006.01)
*B29L 31/30* (2006.01)
*B29K 101/12* (2006.01)
*B29K 705/02* (2006.01)
*B29C 45/14* (2006.01)

(52) U.S. Cl.
CPC ........... *B62D 29/008* (2013.01); *B62D 29/04* (2013.01); *B29C 45/14311* (2013.01); *B29K 2101/12* (2013.01); *B29K 2705/02* (2013.01); *B29K 2705/12* (2013.01); *B29L 2031/3044* (2013.01); *B32B 2605/08* (2013.01); *B60K 11/04* (2013.01); *B60R 2019/486* (2013.01)

(56) References Cited

U.S. PATENT DOCUMENTS 8,485,295 B2 * 7/2013 Mildner ............... B62D 25/084
                                              180/68.1
9,162,641 B2 * 10/2015 Townson ............. B62D 25/084

2011/0039470 A1 * 2/2011 Wakeman ............... B32B 27/12
                                              442/394
2014/0132035 A1 * 5/2014 Townson ........... B29D 99/0053
                                              296/193.1
2015/0336304 A1 11/2015 Bosg et al.

FOREIGN PATENT DOCUMENTS

| KR | 20150034770 A | 4/2015 |
| KR | 1020150043855 A | 4/2015 |
| KR | 101585546 B1 | 1/2016 |
| KR | 20160093641 A | 8/2016 |
| WO | 2006100379 A1 | 9/2006 |
| WO | 2015165939 A1 | 11/2015 |
| WO | 2017109647 A1 | 6/2017 |

OTHER PUBLICATIONS

Oficial Notice of Second Rejection from Korean Intellectual Property Office for Application No. 10-2018-0106550; dated Jul. 28, 2020; 8 pages (English Translation provided; 8 pages).

Official Notice of Preliminary Rejection from Korean Intellectual Property Office for Application No. 10-2018-0106550 dated Jan. 30, 2020 (English Translation provided).

* cited by examiner

MONOBLOC PART FORMING A FRONT BLOC COMPRISING AN ABSORPTION SYSTEM AND AN AERODYNAMIC SYSTEM

FIELD OF THE INVENTION

This invention relates to the field of motor vehicles. In particular, the invention relates to a front block module for motor vehicles.

BACKGROUND OF THE INVENTION

A motor vehicle front block comprising in particular a technical front-end supporting functional elements such as a cooling system (radiator), a bumper skin or optical elements, and an energy absorption system is already known in the prior art, especially in document WO2006/100379.

An energy absorption system comprises at least a bumper beam, to transmit the forces to the longitudinal beams of the vehicle. Such a beam is generally called "top bumper beam" or "upper bumper beam", and is positioned in front of the technical front-end. This system generally also comprises a pedestrian impact protection system (upper structure absorber and lower structure stiffener).

This front block structure therefore includes separate parts each having specific features, in particular the bumper beam which performs a structural role, and the technical front-end which performs a more functional role. This may lead to difficulties when assembling the parts together and impose certain constraints on the vehicle style. For example, the style of the bumper skin is affected by the position of the bumper beam to prevent the bumper beam from being seen from an air inlet opening.

In order to reduce $CO_2$ emissions, this environment may also include one or more frames (generally made of plastic), on which mobile elements, called air inlet shutters, are mounted. These elements are part of an active aerodynamic system wherein an actuator controls the movement of the mobile elements, whose function is to allow the incoming air to flow through the bumper grilles and, depending on the vehicle speed configurations, to block them.

This type of frame is assembled on the bumper beam, underneath, on top or underneath and on top, which makes the various elements more complicated to assemble on the front block.

In addition, this type of front block architecture makes certain functions redundant, leading to a large number of parts and therefore making the front block heavier. For example, the frame comprises horizontal walls, which is also the case for the air guides between the bumper skin and the cooling system. Another example also concerns the frame of the mobile shutters: this frame acts as a structure for the mobile shutters, while in this environment, the bumper beam and the pedestrian lower structure stiffener also act as a structure.

We therefore see that the known front blocks comprise a number of elements which must be assembled during a multitude of more or less complex steps during assembly on the vehicle, and that numerous functions performed by some of these elements are redundant, making assembly complex and making the front block heavier.

SUMMARY OF THE INVENTION

The main objective of this invention is to propose a monobloc part, forming a vehicle front block module which is lighter and whose assembly is simplified. The invention thus relates to a monobloc part forming a front block module wherein aerodynamic functions (frame for controlled shutters), associated with other neighbouring aerodynamic functions (mobile shutters), are integrated in the bumper beam in a structural frame which is partly formed by the bumper beam itself.

The invention relates to a monobloc part forming a front block for motor vehicle comprising a structural portion forming an energy absorption system, and a moulded semi-structural portion forming at least an aerodynamic system, the semi-structural portion being overmoulded on the structural portion.

The monobloc part forming a front block module according to the invention offers, in particular, the following advantages:

fewer parts on the vehicle, thus providing a compact system, simpler logistic flow since there are fewer part references, and simpler assembly in the factory for the manufacturer (only one part to be mounted on the vehicle);

a lighter purely aerodynamic function since less material is used, and there is no need to manufacture a frame which is redundant with the portions of the frame already designated in the existing parts for other functions. Furthermore, the weight reduction is also obtained by eliminating attachments between elements of the front block. For example, the structure of the frames of the controlled shutters is created by the monobloc part directly (the controlled shutters are clipped directly onto the monobloc part) and the semi-structural portion can act directly as wall and air guide.

The monobloc part may further comprise one or more of the following characteristics, taken alone or in combination:

the aerodynamic system comprises alone or in combination at least one of the following elements: a frame for controlled shutters, an air guide, a subframe deflector, a plate;

the semi-structural portion is adapted to support at least one of the following functional elements: a cooling system, a bumper skin, an optical element;

the semi-structural portion is made of thermoplastic material based on at least one of the following products: polypropylene (PP), polyamide (PA), polyethylene (PE), polycarbonate and polybutylene terephthalate (PC-PBT);

the thermoplastic material is reinforced by reinforcement elements;

the semi-structural portion is made of two materials and comprises lips of elastomer type material;

the structural portion comprises at least one of the following elements: a bumper beam bar, a "crash box" type shock absorber, a pedestrian impact protection system;

the structural portion comprises a bumper beam bar made of steel, aluminium or composite material;

the semi-structural portion supports a battery charger and/or an electronic control unit (ECU).

The invention also relates to an assembly of a monobloc part according to the invention and at least one of the following functional elements: a cooling system, a bumper skin, an optical element.

The invention also relates to a method for manufacturing a monobloc part forming a front block for motor vehicle according to the invention wherein the structural portion forming an energy absorption system is manufactured then, using a mould and a plastic material, the semi-structural portion is overmoulded on the structural portion, so that the semi-structural portion forms at least an aerodynamic system.

The method may further comprise one or more of the following characteristics, taken alone or in combination:
the mould is an injection mould;
the structural portion is produced by manufacturing a steel bumper beam bar using a method chosen alone or in combination amongst the following methods: rollforming, hydroforming, cold drawing, hot drawing;
the structural portion is produced by manufacturing an aluminium bumper beam bar using a method chosen alone or in combination amongst the following methods: drawing, extrusion;
the structural portion is produced by manufacturing a bumper beam bar made of composite material using a method chosen alone or in combination amongst the following methods: thermocompression, stamping, extrusion, pultrusion;
the bumper beam bar is introduced into the mould as an insert to be overmoulded;
the mechanical adhesion between the structural portion and the semi-structural portion is improved by making holes in the structural portion before overmoulding, so that the plastic overmoulding material can flow through the holes;
the chemical adhesion between the structural portion and the semi-structural portion is improved by performing at least one of the following steps: adding an adhesive to the structural portion before overmoulding by powdering, spray, glue and/or film; adding an adhesive to a resin of the plastic material, such as maleic anhydride;
the semi-structural portion is made in a single overmoulding step;
the semi-structural portion is made of two materials, of which at least one is an elastomer type material;
after the overmoulding step, secondary functions such as controlled shutters, motor mechanisms, wires, electronics and sensors are assembled on the monobloc part.

BRIEF DESCRIPTION OF THE DRAWINGS

The invention will be better understood on reading the accompanying figures, which are given solely by way of example and not limiting in any way, in which.

DETAILED DESCRIPTION OF THE INVENTION

Figure 1:
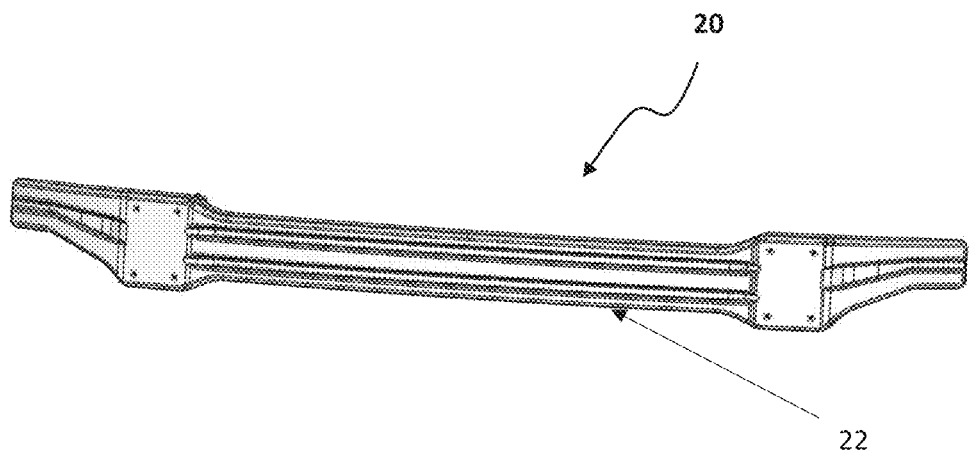
FIG. 1 is a first example of a structural portion of a monobloc part forming a front block module according to the invention.

As illustrated on FIGS. 2, 4, 5 and 6, the monobloc part 10 according to the invention forms a front block for motor vehicle and comprises a structural portion 20 and a semi-structural portion 30.
The structural portion 20 comprises at least one of the following elements: a bumper beam bar 22, a "crash box" type shock absorber 24, a pedestrian impact protection system 26 (upper structure absorber and lower structure stiffener).
When the structural portion 20 comprises a bumper beam bar 22, the latter is advantageously made of steel, aluminium or composite material.
The structural portion 20 forms an energy absorption system, as illustrated on FIGS. 1 and 3. The term structural means an element adapted to absorb an impact suffered by the vehicle.
The semi-structural portion 30 is moulded, in particular by an injection moulding method. During this injection moulding, the semi-structural portion 30 is overmoulded on the structural portion 20 which acts as an insert. Thus, the two portions, structural 20 and semi-structural 30, form a single monobloc part 10. The term semi-structural means an element which supports secondary functions and which is not intended to absorb impacts other than low-energy impacts (pedestrian impact and parking impact).
The semi-structural portion 30 forms at least an aerodynamic system 40. An aerodynamic system means a set of shapes adapted to perform an aerodynamic function for the vehicle, or to contribute to such a function. Such shapes may therefore correspond to an air guide, a frame for controlled shutters, or a subframe deflector for example. The semi-structural portion 30 therefore forms, by moulding, at least one of these elements: frame for controlled shutters 42, air guide 44, subframe deflector 46.
Thus, the controlled shutters used on the vehicle to regulate the air flow at the front of the vehicle are directly positioned on the moulded semi-structural portion 30 (at the moulded frame 42). Consequently, there is no longer any need to mount them on a frame, itself assembled to the front block. In addition, if the bumper beam 22 moves backwards during an impact, the controlled shutters also move towards the rear of the vehicle.
Thus, the semi-structural portion forms elements useful for the overall aerodynamic system of the vehicle.
According to one embodiment, the semi-structural portion 30 supports at least one of the following functional elements 50, taken alone or in combination: a cooling system 52 (see FIG. 5) such a radiator, a bumper skin 54 (see FIG. 6), an optical element 56 (see FIG. 6).
Advantageously, the semi-structural portion 30 supports a battery charger. This arrangement is especially advantageous when the vehicle is an electric vehicle. This charger may be integrated directly in the semi-structural portion 30, the semi-structural portion 30 overmoulding the charger, for example.
Advantageously, the semi-structural portion 30 supports an electronic control unit (ECU). Such a unit generally consists of a box which, in this case, is supported by the semi-structural portion 30. This electronic control unit can be integrated directly in the semi-structural portion 30, the semi-structural portion 30 overmoulding the electronic control unit (ECU), for example.
According to an example, the monobloc part 10 includes the bumper reinforcement functions. The part 10 may thus be advantageously pre-assembled with the bumper before being supplied to the vehicle manufacturer.
According to an example, the monobloc part 10 includes the bumper stiffness reinforcement functions. The part 10 may thus advantageously include a plate 48.
The part 10 thus allows better management of the vehicle diversity: for example, for a basic version of a vehicle, the controlled shutters 58 are not necessarily mounted on the part 10, and the frame 42 of the controlled shutters 58 present on the semi-structural portion 30 acts in this case as air guide towards the radiator. More upmarket versions could thus be produced by post-assembling components after the moulding step.

Advantageously, the semi-structural portion 30 is made of thermoplastic material, for example a material based on at least one of the following products: polypropylene (PP), polyamide (PA), polyethylene (PE), polycarbonate and polybutylene terephthalate (PC-PBT).

The plastic material is advantageously reinforced by reinforcement elements such as: glass fibres, carbon fibres or mineral or natural fillers such as talc.

Figure 2:
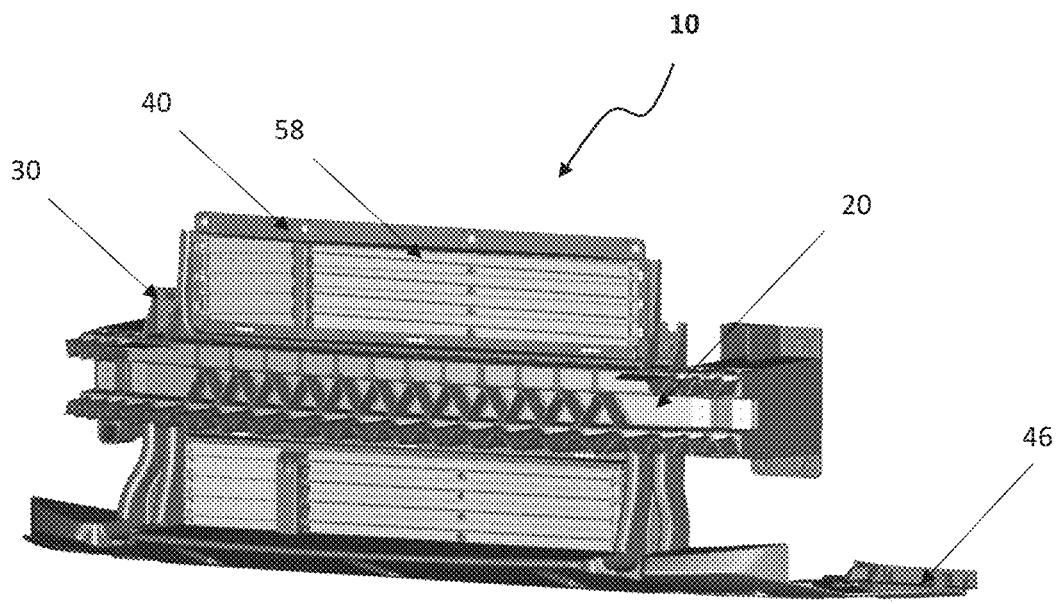
FIG. 2 is a first example of a monobloc part forming a front block module according to the invention, comprising the structural portion of FIG. 1.
Figure 3:
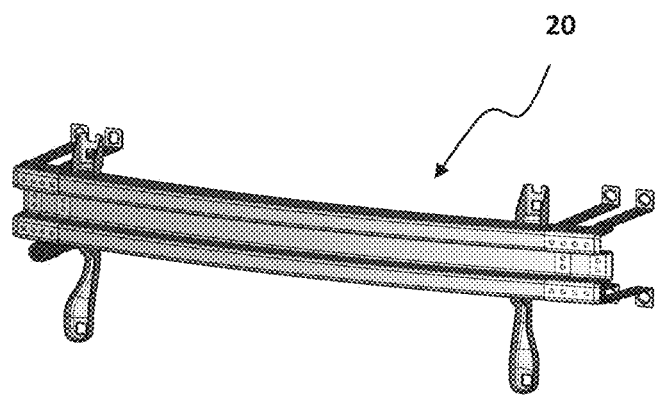
FIG. 3 is a second example of a structural portion of a monobloc part forming a front block module according to the invention.

FIG. 2 illustrates a first example of a monobloc part 10 forming a front block module according to the invention. This part 10 comprises the structural portion 20 illustrated on FIG. 1. As can be seen, the stiffness of the frames 42 of the controlled shutters 58 positioned under the bumper beam 22 is provided by the bumper beam 22 in the upper structure and by the pedestrian stiffener in the lower structure. The direct link of material between upper and lower structures provides better mechanical strength than an assembly which tends to cause stress concentrations.

Figure 4:
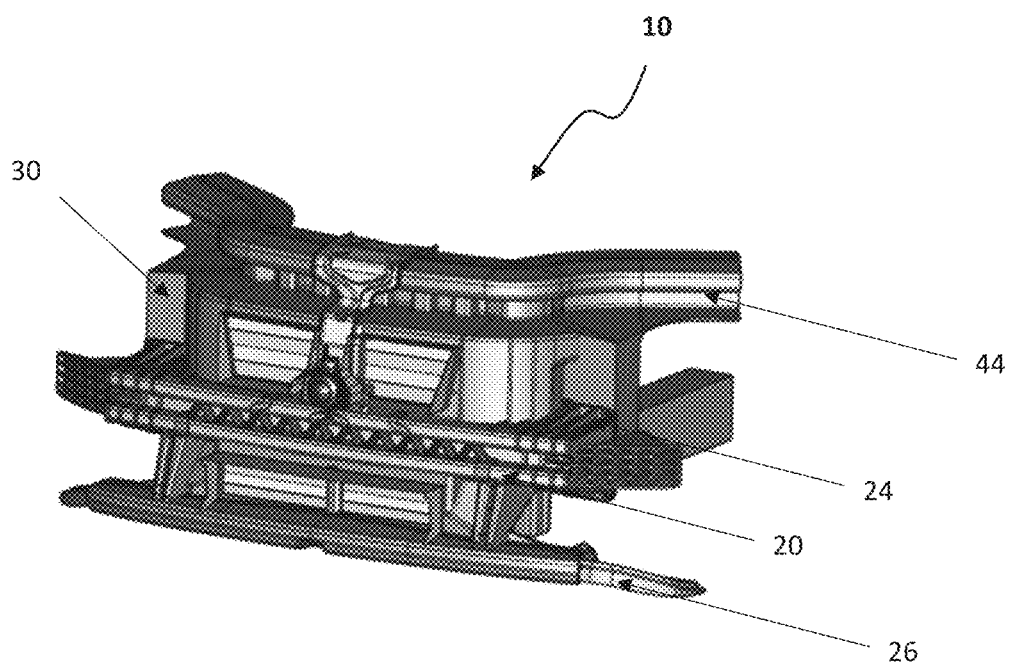
FIG. 4 is a second example of a monobloc part forming a front block module according to the invention, comprising the structural portion of FIG. 3.

FIG. 4 illustrates a second example of a monobloc part 10 forming a front block module according to the invention. This part 10 comprises the structural portion 20 illustrated on FIG. 3. The lower portion of the part 10 acts as upper guide for the mobile shutters, especially if ribs are added, and in the lower part, the lower structure convergent guides air between the bumper and the controlled shutters. The air inlet area is maximised especially on the top (beam) and the bottom (convergent).

Figure 5:
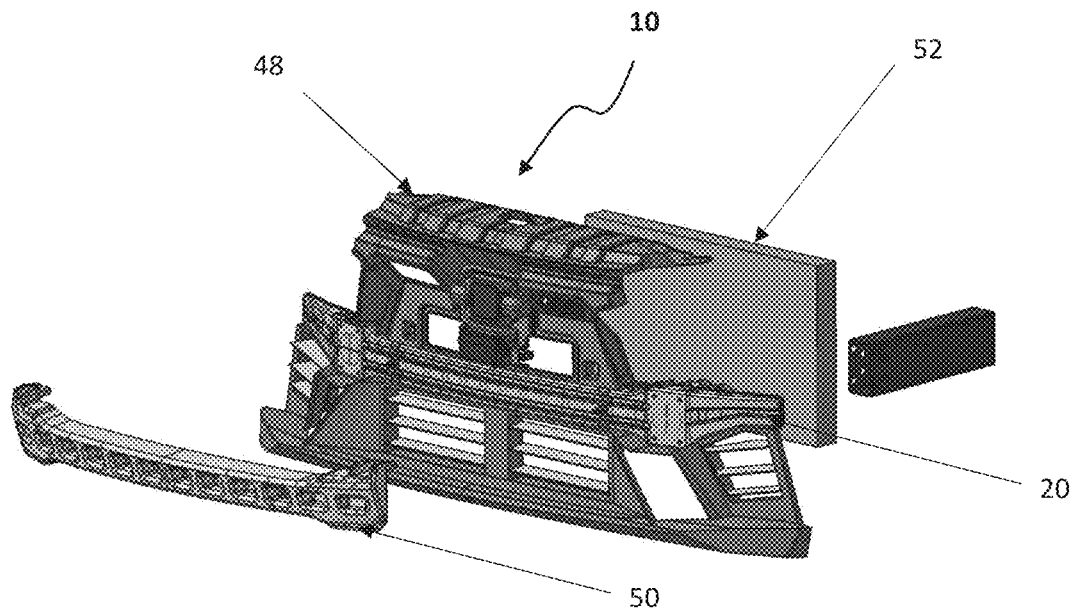
FIG. 5 is a third example of a monobloc part forming a front block module according to the invention.
Figure 6:
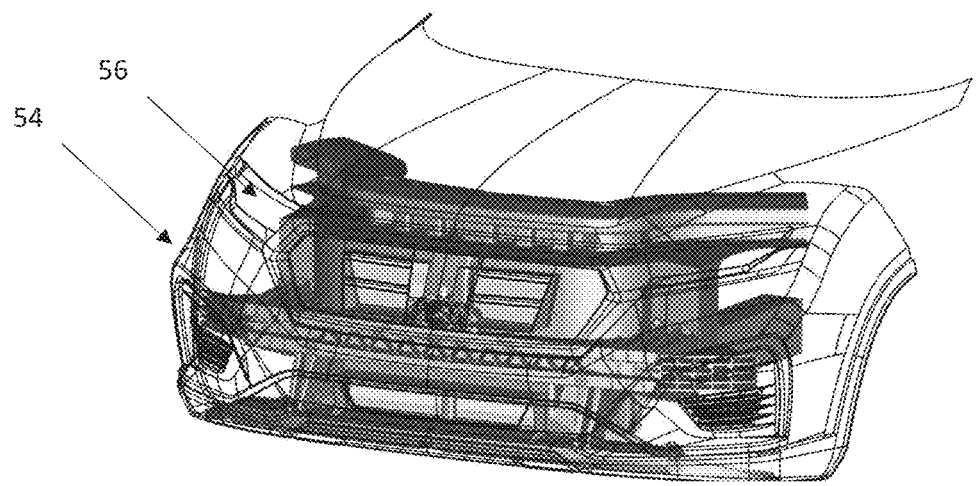
FIG. 6 is the front of a motor vehicle, provided with a monobloc part according to the invention.

FIG. 5 illustrates a third example of a monobloc part 10 forming a front block module according to the invention.

The invention also relates to a method for manufacturing a monobloc part 10, forming a front block for motor vehicle according to the invention.

According to this method, the structural portion 20 forming an energy absorption system is manufactured then, using a mould and a plastic material, the semi-structural portion 30 is overmoulded on the structural portion 20. Overmoulding is carried out so that the semi-structural portion 30 forms at least an aerodynamic system 40.

An injection mould is preferably used for the overmoulding operation.

The structural portion 20 is made by manufacturing at least one bumper beam bar 22. This bumper beam bar 22 is then introduced into the mould as an insert to be overmoulded. Various techniques can be used to manufacture the bar 22, depending on the material used.

According to a first embodiment, the bumper beam bar 22 is made of steel using a method chosen alone or in combination amongst the following methods: rollforming, hydroforming, cold drawing, hot drawing.

According to a second embodiment, the bumper beam bar 22 is made of aluminium using a method chosen alone or in combination amongst the following methods: drawing, extrusion.

According to a third embodiment, the bumper beam bar 22 is made of composite material using a method chosen alone or in combination amongst the following methods: thermocompression, stamping, extrusion, pultrusion.

The part 10 according to the invention thus forms a monobloc part forming a front block module wherein aerodynamic functions are integrated in the bumper beam in a structural frame which is partly formed by the bumper beam itself.

It is therefore important that the structural portion 20 and the semi-structural portion 30 have good cohesion, so that they do not separate if the vehicle suffers an impact, in particular.

To do this, according to one embodiment, the mechanical adhesion between the structural portion 20 and the semi-structural portion 30 is improved by making holes in the structural portion 20 before overmoulding, so that the plastic overmoulding material can flow through the holes.

To improve the cohesion between the two portions, the chemical adhesion can also be improved, alternatively or as a complement, between the structural portion 20 and the semi-structural portion 30, by performing at least one of the following steps:

adding an adhesive to the structural portion 20 before overmoulding by powdering, spray, glue and/or film;

adding an adhesive to a resin of the plastic material, such as maleic anhydride.

According to one embodiment, the semi-structural portion 30 is made in a single step, during injection. In other words, all the functions supported by the semi-structural portion 30 are moulded at the same time. Thus, various functions are integrated directly in the monobloc part, with no additional assembly. Thus, during the single overmoulding step, sensor supports, moulded air guides, frame for the mobile shutters, etc. can be overmoulded without the need to attach additional supports.

According to a second embodiment, the semi-structural portion 30 is made of two materials, during the injection step. This method offers the advantage of being able to integrate flexible lips which improve the sealing with the bumper and/or the engine cooling system. The flexible lips can be made of an elastomer type material.

Obviously, the functions of the monobloc part 10 could also be completed by elements 50 assembled after the overmoulding step, such as: controlled shutters 58, motor mechanisms, wires, electronics, sensors, etc.

PARTS LIST

10: monobloc part forming a front block for motor vehicle
20: structural portion of the monobloc part 10
22: bumper beam bar of the structural portion 20
24: "crash box" type shock absorber of the structural portion 20
26: pedestrian impact protection system of the structural portion 20
30: semi-structural portion of the monobloc part 10
40: aerodynamic system of the semi-structural portion 30
42: frame for controlled shutters 42 of the aerodynamic system 40
44: air guide 44 of the aerodynamic system 40
46: subframe deflector of the aerodynamic system 40
48: plate of the monobloc part 10
50: functional elements 50 supported by the semi-structural portion 30, assembled on the part 10, after the overmoulding step
52: cooling system of the functional elements 50
54: bumper skin of the functional elements 50
56: optical element of the functional elements 50
58: controlled shutters

What is claimed is:

1. A monobloc part forming a front block for motor vehicle comprising a structural portion forming an energy absorption system, and a moulded semi-structural portion forming at least an aerodynamic system, the semi-structural portion being overmoulded on the structural portion and the structural portion comprises at least one of the following elements: a bumper beam bar, a crash box type shock absorber, a pedestrian impact protection system.

2. The part according to claim 1, wherein the aerodynamic system comprises alone or in combination at least one of the following elements: a frame for controlled shutters, an air guide, a subframe deflector, a plate.

3. The part according to claim 1, wherein the semi-structural portion is adapted to support at least one of the following elements: a cooling system, a bumper skin, an optical element.

4. The part according to claim 1, wherein the semi-structural portion is made of thermoplastic material based on at least one of the following products: polypropylene (PP), polyamide (PA), polyethylene (PE), polycarbonate and polybutylene terephthalate (PC-PBT).

5. The part according to claim 1, wherein the thermoplastic material is reinforced by reinforcement elements.

6. The part according to claim 1, wherein the semi-structural portion is made of two materials and comprises lips of elastomer type material.

7. The part according to claim 1, wherein the structural portion comprises a bumper beam bar made of steel, aluminium or composite material.

8. The part according to claim 1, wherein the semi-structural portion supports a battery charger and/or an electronic control unit (ECU).

9. The part according to claim 1 further comprising an assembly including the part and at least one of: a cooling system, a bumper skin, an optical element.

10. A method for manufacturing a monobloc part comprising forming a front block for motor vehicle, the block for the motor vehicle having a structural portion forming an energy absorption system, and a moulded semi-structural portion forming at least an aerodynamic system, the semi-structural portion being overmoulded on the structural portion so that the semi-structural portion forms the at least an aerodynamic system, wherein the structural portion forming an energy absorption system is manufactured then, using a mould and a plastic material to create the semi-structural portion which is overmoulded on the structural portion and wherein the structural portion comprises at least one of the following elements: a bumper beam bar, a crash box type shock absorber, a pedestrian impact protection system.

11. The method according to claim 10, wherein the mould is an injection mould.

12. The method according to claim 10, wherein the structural portion is produced by manufacturing a steel bumper beam bar using a method chosen alone or in combination amongst the following methods: rollforming, hydroforming, cold drawing, hot drawing.

13. The method according to claim 10, wherein the structural portion is produced by manufacturing an aluminium bumper beam bar using a method chosen alone or in combination amongst the following methods: drawing, extrusion.

14. The method according to claim 10, wherein the structural portion is produced by manufacturing a bumper beam bar made of composite material using a method chosen alone or in combination amongst the following methods: thermocompression, stamping, extrusion, pultrusion.

15. The method according to claim 10, wherein the bumper beam bar is introduced into the mould as an insert to be overmoulded.

16. The method according to one of claim 10, wherein mechanical adhesion between the structural portion and the semi-structural portion is improved by making holes in the structural portion before overmoulding, so that the plastic overmoulding material can flow through the holes.

17. The method according to claim 10, wherein chemical adhesion between the structural portion and the semi-structural portion is improved by performing at least one of the following steps:
adding an adhesive to the structural portion before overmoulding by powdering, spray, glue and/or film;
adding an adhesive to a resin of the plastic material.

18. The method according to claim 17 wherein the adhesive added to the resin of the plastic material is maleic anhydride.

19. The method according to claim 10, wherein the semi-structural portion is made in a single overmoulding step.

20. The method according to claim 10, wherein the semi-structural portion is made of two materials, of which at least one is an elastomer type material.

21. The method according to claim 10, wherein after the overmoulding step, secondary functions are assembled on the monobloc part, the secondary functions including one or more of: controlled shutters, motor mechanisms, wires, electronics and sensors.

* * * * *

UNITED STATES PATENT AND TRADEMARK OFFICE
CERTIFICATE OF CORRECTION

| | | |
|---|---|---|
| PATENT NO. | : 11,059,520 B2 | Page 1 of 1 |
| APPLICATION NO. | : 16/124703 | |
| DATED | : July 13, 2021 | |
| INVENTOR(S) | : Stéphane Ginja | |

It is certified that error appears in the above-identified patent and that said Letters Patent is hereby corrected as shown below:

On the Title Page

Item (71), Line 1:
"Compagnie Plastic Omnium, Lyons"
Should be changed to:
-- Compagnie Plastic Omnium, Lyon --

Signed and Sealed this
Seventh Day of September, 2021

Drew Hirshfeld
*Performing the Functions and Duties of the
Under Secretary of Commerce for Intellectual Property and
Director of the United States Patent and Trademark Office*